United States Patent [19]
Nagata et al.

[11] Patent Number: 5,469,317
[45] Date of Patent: Nov. 21, 1995

[54] THIN FILM MAGNETORESISTIVE HEAD FOR MAGNETIC RECORDING AND REPRODUCING APPARATUS

[75] Inventors: Yuji Nagata, Yao; Toshio Fukazawa, Fushimi; Kumiko Wada, Kawanishi; Yoshihiro Tosaki, Ibaraki, all of Japan

[73] Assignee: Matsushita Electric Industrial Co., Ltd., Osaka, Japan

[21] Appl. No.: 255,802

[22] Filed: Jun. 7, 1994

Related U.S. Application Data

[62] Division of Ser. No. 82,813, Jun. 28, 1993, which is a continuation of Ser. No. 599,355, Oct. 5, 1990.

[30]    Foreign Application Priority Data

Oct. 11, 1989   [JP]   Japan ........................ 1-264406

[51] Int. Cl.⁶ ............................................... G11B 5/127
[52] U.S. Cl. ........................................... 360/113; 360/126
[58] Field of Search .................................. 360/113, 121, 360/125, 126; 29/603

[56]              References Cited

U.S. PATENT DOCUMENTS

| | | | |
|---|---|---|---|
| 4,435,900 | 3/1984 | de Wilde | 360/113 |
| 4,679,107 | 7/1987 | Imakoshi et al. | 360/113 |
| 4,757,410 | 7/1988 | Seko et al. | 360/113 |
| 4,803,581 | 2/1989 | Kira et al. | 360/113 |
| 4,907,113 | 3/1990 | Mallary | 360/113 |
| 4,954,920 | 9/1990 | Yamada et al. | 360/113 |
| 5,095,397 | 3/1992 | Nagata et al. | 360/113 |
| 5,097,371 | 3/1992 | Somers | 360/113 |

FOREIGN PATENT DOCUMENTS

| | | | |
|---|---|---|---|
| 3603292 | 7/1986 | Germany | 360/113 |
| 52-9413 | 7/1977 | Japan . | |
| 60-69808 | 4/1985 | Japan . | |
| 1177616 | 8/1986 | Japan . | |
| 1255525 | 11/1986 | Japan . | |
| 2140219 | 6/1987 | Japan . | |

OTHER PUBLICATIONS

"A Magnetoresistive Readout Transducer", Robert P. Hunt, Member, IEEE, IEEE Transactions On Magnetics, vol. Mag-7, No. 1, Mar. 1971, pp. 150–154.

"Magnetoresistive Heads", W. F. Druyvesteyn et al., IEEE Transactions On Magnetics, vol. Mag. 17, No. 6, Nov. 1981, pp. 2884–2889.

*Primary Examiner*—A. J. Heinz
*Assistant Examiner*—Jefferson Evans
*Attorney, Agent, or Firm*—Wenderoth, Lind & Ponack

[57]                ABSTRACT

In a magnetoresistive head capable of performing favorable magnetic recording and reproduction, an overlap width of a front yoke and a magnetoresistive element is always wider than an overlap width of a back yoke and the magnetoresistive element. Generally, the magnetoresistive head varies in its reproduction efficiency by the overlap width of the yoke and magnetoresistive element. In particular, the reproduction output is significantly affected by the overlap width of the front yoke and magnetoresistive element, and when the overlap width of the front yoke becomes narrower than the overlap width of the back yoke, the reproduction output tends to decrease abruptly. Therefore, by keeping the overlap width of the front yoke always wider than the other, a stable reproduction output can be achieved. In particular, an outstanding effect is obtained in a multi-channel magnetoresistive head containing multiple magnetoresistive elements in one head.

1 Claim, 4 Drawing Sheets

THIN FILM MAGNETORESISTIVE HEAD FOR MAGNETIC RECORDING AND REPRODUCING APPARATUS

This application is a Divisional application of now abandoned application Ser. No. 08/082,813, filed Jun. 28, 1993, which in turn is a Continuation application of abandoned application Ser. No. 07/599,355, filed Oct. 5, 1990.

BACKGROUND OF THE INVENTION

1. Field of the Invention

The present invention relates to a thin-film magnetic head used in magnetic recording and/or reproducing apparatus and more particularly to a magnetoresistive head.

2. Description of the Prior Art

Recently, to cope with the trend of higher recording density, higher data transfer speed and multiple channels in magnetic recording and/or reproducing apparatus, the thin-film magnetic head is now being used. In particular, in a magnetic recording and/or reproducing apparatus in which the recording medium runs at a low speed, a magnetoresistive head whose output during reproduction does not depend on the speed is used.

A magnetoresistive head of a simplest structure has already been disclosed, for example, in the published paper, "A Magnetoresistive Readout Transducer," R. P. Hunt, IEEE Trans. Magn. Vol. 1, MAG-7, No. 1 (March 1971), pp.150–154. In this magnetoresistive head, a magnetoresistive element composed of a Ni-Fe alloy thin film with a film thickness of hundreds of Angströms is disposed vertically or horizontally on the recording medium, and a pair of electrodes are disposed at both ends of this magnetoresistive element. For signal detection, the resistance change of the magnetoresistive element due to the signal magnetic field generated by the recording medium is converted into a voltage change by the constant current in the magnetoresistive element flowing through the electrodes. However, in the magnetoresistive head in which the magnetoresistive element is disposed horizontally, since its reproduction resolution depends on the geometric shape of the magnetoresistive element, a signal recorded at a high density of a recording wavelength of several micrometers or less cannot be reproduced. Or, in the magnetoresistive head in which the magnetoresistive element is disposed vertically, since the intensity of the signal magnetic field from the recording medium is attenuated in accordance with an exponential function with respect to the distance from the magnetoresistive element to the recording medium, and the signal magnetic field becomes smaller generally as the recording wavelength becomes shorter; therefore, reproduction sensitivity is particularly poor in the short wavelength region of a recording wavelength of several micrometers or less. Furthermore, in either magnetoresistive head, the wear of the magnetoresistive element is inevitable because it is kept in contact with the recording medium.

A magnetoresistive head intended to solve the above problems of wear and the lowering of the reproduction capability in the short wavelength region has been already disclosed, for example, in the Japanese Laid-open Patent No. 52-9413. This magnetoresistive head comprises a bias conductor made of a conductive material for applying a bias magnetic field to a magnetoresistive element; the magnetoresistive element; a pair of electrodes for passing a driving current to the magnetoresistive element, and two magnetic yokes, that is, a front yoke and a back yoke, which are sequentially formed on a magnetic substrate by way of an insulation layer such as $SiO_2$. The front yoke and back yoke are disposed so that one end of each yoke overlaps one of thereof overlap the ends of the magnetoresistive element. Between the front yoke and the magnetic substrate, a magnetic gap is formed in order to lead the recording magnetic field generated from the recording medium into the magnetic head.

At this time, mainly thin-film forming technology such as vacuum deposition and sputtering, or fine pattern technology such as photolithography is employed to produce the magnetic heads.

This magnetoresistive head possesses advantages in that the magnetoresistive element is not worn because the magnetoresistive element does not directly contact the recording medium, and in that signals with a recording wavelength of 1 μm or less are reproduced by setting the magnetic gap at 1 μm or less.

Such a conventional magnetoresistive head is designed generally so that the both ends of the magnetoresistive element overlap the front yoke and back yoke by the same overlapping amount.

In the fabrication of such a magnetoresistive head, however, the position of the magnetoresistive element tends to be shifted longitudinally due to various causes including pattern matching precision in the process of photolithography. Accordingly, when a plurality of magnetic heads are fabricated, their reproduction output varies greatly. This is a fatal problem for fabricating a multi-channel magnetoresistive head.

SUMMARY OF THE INVENTION

It is hence a primary object of the invention to present a magnetoresistive head capable of magnetically recording and reproducing favorably, by solving the problems of the conventional magnetoresistive head mentioned above.

To achieve the above object, in the magnetoresistive head of the present invention, a magnetoresistive element has a part where the magnetoresistive element overlaps the front yoke and a part where the magnetoresistive element overlaps the back yoke such that a width of the part where the magnetoresistive element overlaps the front yoke is wider than a width of the part where the magnetoresistive element overlaps the back yoke.

By this constitution, a magnetoresistive head generating a stable reproduction output can be obtained. The reason is described below.

That is, the magnetoresistive head varies in its reproduction efficiency depending on the overlap amount. In particular, the reproduction output is largely affected by the overlap amount of the front yoke and the magnetoresistive element, and when the overlap amount of the front yoke becomes smaller than the overlap amount of the back yoke, the reproduction output tends to decline sharply.

Therefore, by setting the magnetoresistive element such that the width of the part where the magnetoresistive element overlaps the front yoke is wider than the width of the part where the magnetoresistive element overlaps the back yoke, a stable reproduction output can be obtained.

DESCRIPTION OF THE PREFERRED EMBODIMENTS

Figure 1:
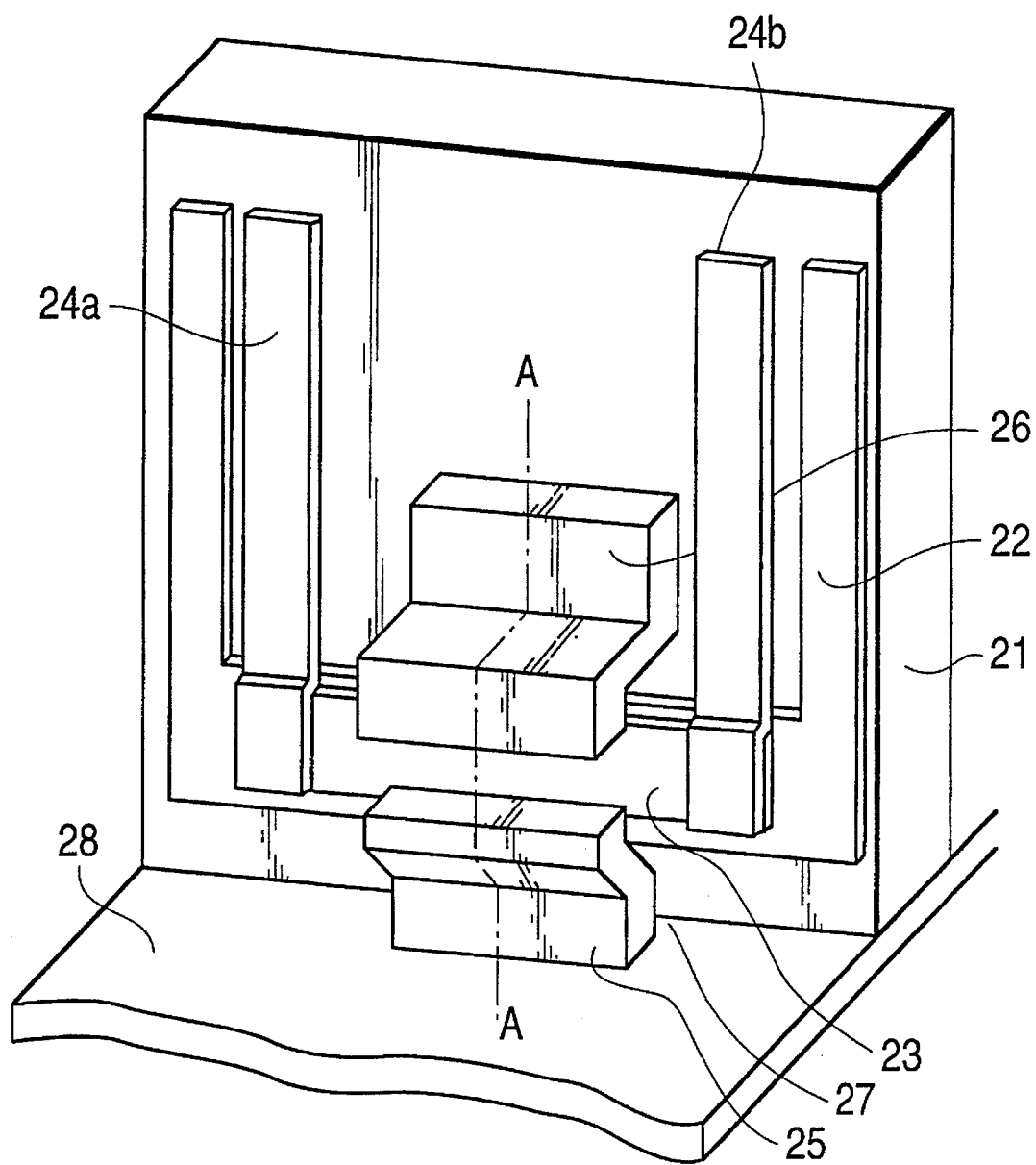
FIG. 1 is an outline view of a magnetoresistive head in accordance with a first preferred embodiment of the present invention.
Figure 2:
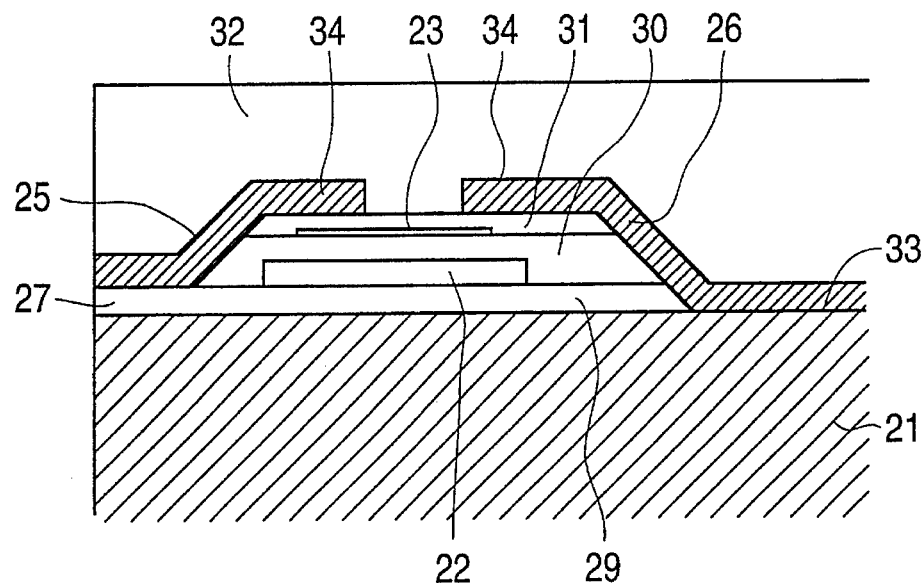
FIG. 2 is a sectional view along a line A—A in FIG. 1.

A preferred embodiment of the present invention is described below firstly by referring to FIG. 1 and FIG. 2. The magnetoresistive head of the embodiment is fabricated in the following manner. In the first place, on a magnetic substrate 21 made of a Ni-Zn ferrite, a Mn-Zn ferrite or the like, a first insulation layer 29 of $SiO_2$, $Al_2O_3$ or the like is formed by sputtering or other methods. On the first insulation layer 29, a conductive thin film of copper, aluminum, gold or the like is formed by vacuum deposition or other method, and is formed into a desired shape by photolithography or other method, so that a bias conductor 22 is formed. The bias conductor 22 is for applying a bias magnetic field to the magnetoresistive element in a direction perpendicular to the track width direction of the track formed on the recording medium. On the bias conductor 22, a second insulation layer 30 of $SiO_2$, $Al_2O_3$ or the like is formed. On the second insulation layer 30, a magnetoresistive element 23 composed of a Ni-Fe alloy thin film or a Ni-Co alloy thin film is formed by vacuum deposition in the magnetic field or by sputtering in the magnetic field so that the easy magnetization axis becomes parallel to the longitudinal direction of the magnetoresistive element 23, and it is patterned in a stripe of 10 µm in width by photolithographic technology. Next, a pair of electrodes 24a and 24b for passing a driving current into the magnetoresistive element 23 are formed so as to be connected to both ends of the magnetoresistive element 23. On the magnetoresistive element 23, a third insulation layer 31 of $SiO_2$ or $Al_2O_3$ is formed. Afterwards, of the first, second and third insulation films, the magnetic gap 27 and the junction 33 of the back yoke 26 and magnetic substrate 21 are removed by etching photolithographically. In particular, the magnetic gap 27 is etched so that the first insulation layer 27 may be left over. Consequently, an Ni-Fe alloy thin film, a sendust thin film or a Co-Nb-Zr amorphous alloy thin film is formed by vacuum deposition or sputtering, and a magnetic yoke 34 divided into a front yoke 25 and a back yoke 26 in the portion of magnetoresistive element 23 is formed by photolithography. In particular, the front yoke 25 and back yoke 26 are formed so that one ends thereof respectively overlap the front and rear ends of the magnetoresistive element 23.

Figure 3:
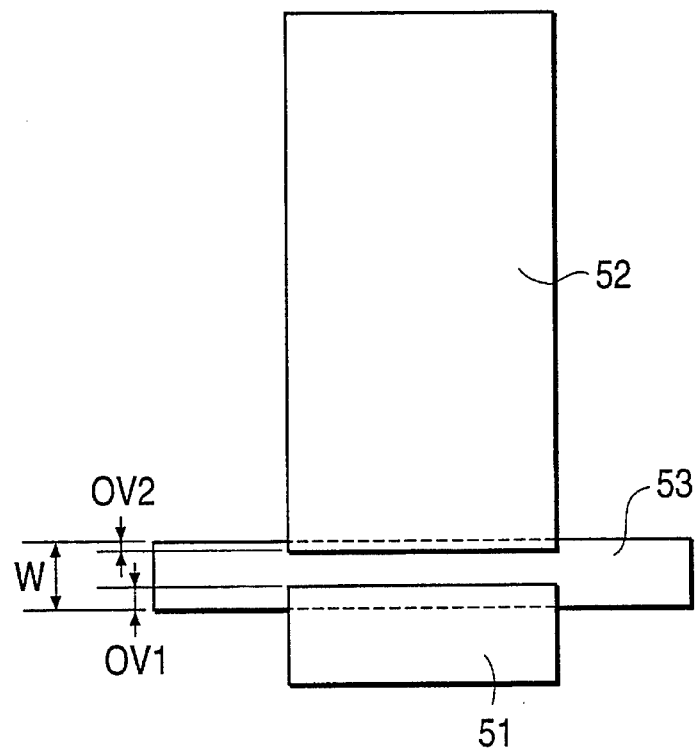
FIG. 3 shows an overlapped pattern of a photomask for a magnetoresistive element and a photo mask for magnetic yokes used in fabrication of the magnetoresistive head in accordance with the first embodiment of the present invention.

FIG. 3 shows patterns of a photomask 53 for the magnetoresistive element and photomasks 51 and 52 for the magnetic yokes used in the fabrication of the preferred embodiment of the present invention, in which the pattern of the magnetic yoke and the pattern of the magnetoresistive element are combined.

The photomasks of the preferred embodiment are designed in the width W of the magnetoresistive element photomask 53 of 10 µm, the overlap width OV1 of a part where the magnetoresistive element photomask 53 overlaps the front yoke photomask 51, of 3 µm, and the overlap width OV2 of a part where the magnetoresistive element photomask 53 overlaps the back yoke photomask 52, of 1 µm. In the actual fabrication of the head, a pattern matching error of about 1 µm at maximum occurs. Therefore, in the magnetoresistive head in the actually fabricated embodiment of the present invention, the overlap width of the front yoke may vary in the range of 2 to 4 µm, and the overlap width with the back yoke may vary in the range of 0 to 2 µm. That is, the photomask for forming the front and back yokes is shifted toward the front side, i.e. by a shift amount larger than a maximum patterning error amount from a position where OV1 and OV2 are the same. Thus, in the magnetoresistive head of the embodiment, the overlap width of the magnetoresistive element with the front yoke, i.e. the width of the part where the magnetoresistive element overlaps the front yoke is set always greater than the overlap width with the back yoke, i.e. the width of the part where the magnetoresistance element overlaps the back yoke.

Figure 4:
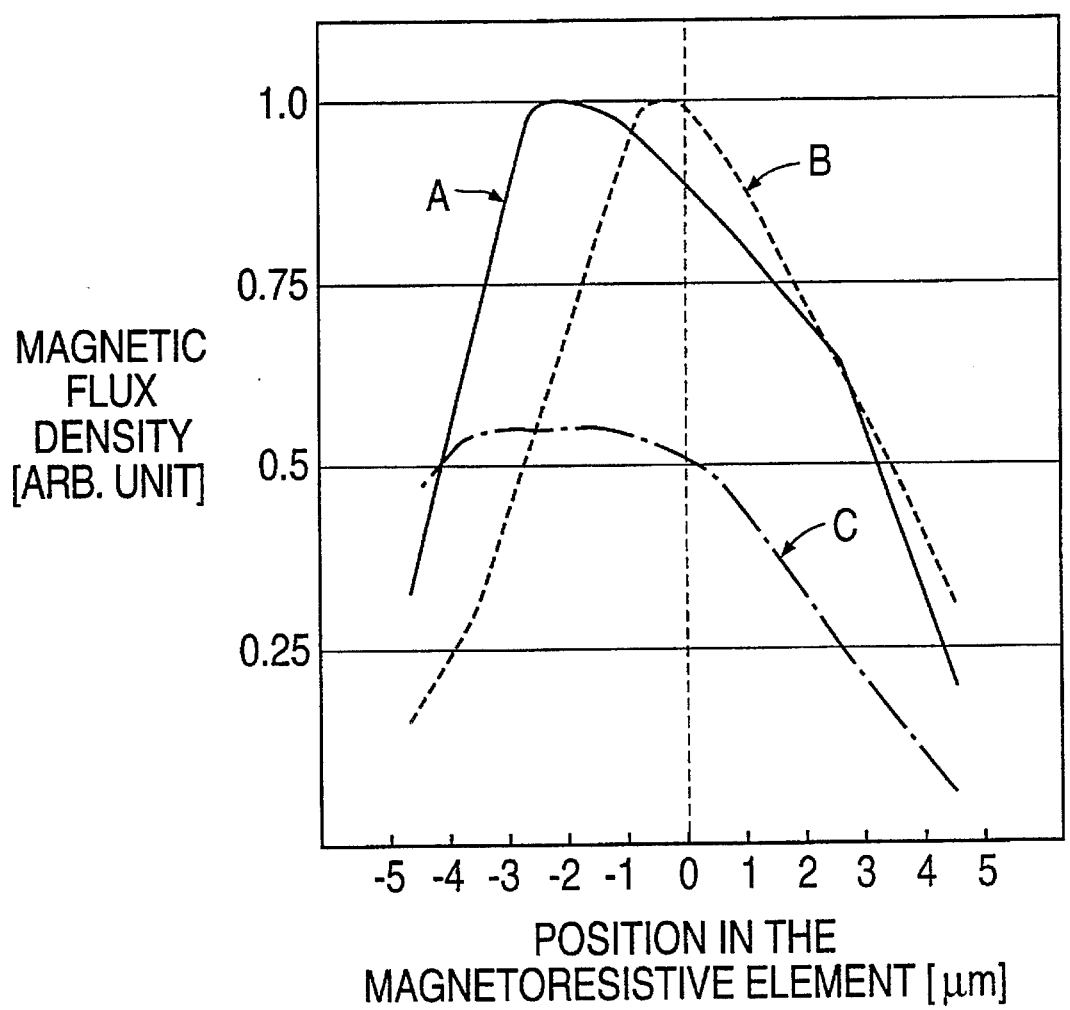
FIG. 4 shows a magnetic density flux distribution in the magnetoresistive element when the position of the magnetoresistive element is changed in the magnetoresistive head of the first embodiment of the present invention.

FIG. 4 shows the result of calculation of the magnetic flux density distribution in the width direction in the magnetoresistive element when the-position of the magnetoresistive element is changed in a magnetoresistive head of the preferred embodiment. The X-axis denotes the width-wise position in the magnetoresistive element, and 0 represents the center of the magnetoresistive element. The Y-axis expresses the ratio of magnetic flux density distribution in the magnetoresistive element. In the diagram, A is the case of the overlapping of the magnetoresistive element 23 with the front yoke 25 and the back yoke 26 by 2 µm each; B is the case of the overlapping of the magnetoresistive element 23 with the front yoke 25 by 4 µm, and C is the case of the overlapping of the magnetoresistive element 23 with the back yoke 26 by 4 µm.

As clear from the diagram, the magnetic flux density distribution of C is lowered notably as compared with the cases A and B. Therefore, in order to suppress the variations in the reproduction output, it is important to keep the width of the part where the magnetoresistive element overlaps the front yoke always wider than the width of the part where the magnetoresistive element overlaps the back yoke.

In fact, in the conventional magnetoresistive head fabricated by using the photomasks designed to have the same overlap width of 2 µm for the front yoke and back yoke, the overlap width of the front yoke varied from 1 to 3 µm, and the overlap width of the back yoke varied from 3 to 1 µm, and the reproduction output varied in a range of ±25%.

On the other hand, in the case of the magnetoresistive head fabricated by using photomasks designed to have an overlap of 3 µm at the front side and an overlap of 1 µm at the back yoke side according to an embodiment of the present invention, the variations of reproduction output settled within a range of the ±5%.

As described herein, in the magnetoresistive head of the present invention, since the width of the part where the magnetoresistive element overlaps the front yoke is wider than the width of the part where the magnetoresistive element overlaps the back yoke, the overlap width of the magnetoresistive element with the front yoke is always greater than the overlap width with the back yoke so that a stable reproduction output is obtained.

Figure 5:
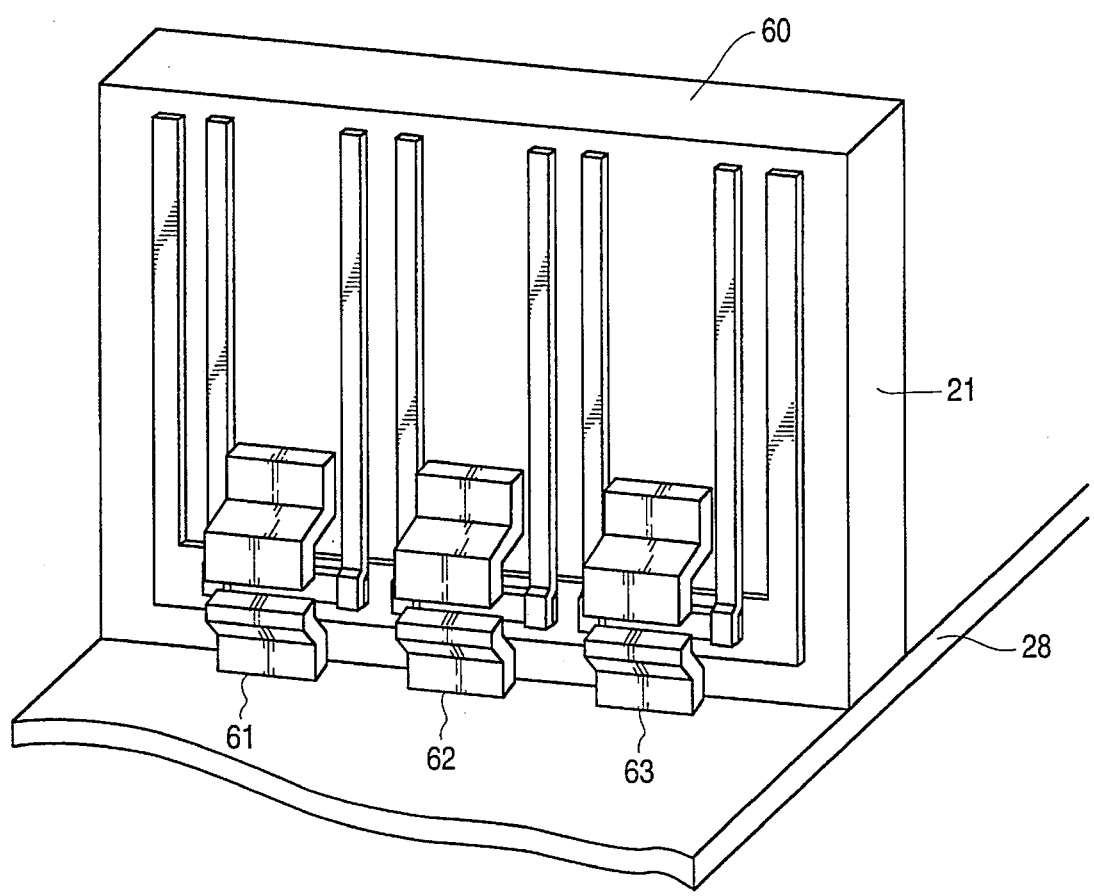
FIG. 5 is an outline view of a multi-channel magnetoresistive head in accordance with a second embodiment of the present invention.

FIG. 5 shows a second embodiment, which is a multi-channel magnetoresistive head 60 having three magnetoresistive head units 61, 62, and 63 disposed on a magnetic substrate 21 in the track widthwise direction. In each of the magnetoresistive head units, the overlap width at the front yoke side is wider than the overlap width at the back yoke side. Therefore, it is effective to keep the variations of the reproduction outputs of the three channels within ±5%. Thus, the effect is great in the multi-channel magnetoresistive head conforming to the magnetoresistive head of the present invention.

What is claimed is:

1. In a method of manufacturing a magnetoresistive head having a magnetoresistive element with substantially parallel front and rear ends as formed on a magnetic substrate, a magnetic gap for leading a magnetic flux signal generated from a recording medium into the head, front and back magnetic yokes respectively overlapping said front and rear ends of the magnetoresistive element, a current supply electrode for supplying a drive current to the magnetoresistive element, and a bias electrode for applying a bias magnetic field to the magnetoresistive element, the improvement comprising:

positioning a photo mask for forming the front and back magnetic yokes at a position over the magnetoresistive element which is displaced in a direction from the front end of the magnetoresistive element toward the rear end of the magnetoresistive element by a displacement amount, which is larger than a maximum patterning error, from a central position in which the photo mask overlaps the front and rear ends of the magnetoresistive element by a same amount; and forming the front and back magnetic yokes using the thus positioned photo mask.

\* \* \* \* \*